United States Patent [19]

Sydansk

[11] Patent Number: 5,322,125
[45] Date of Patent: Jun. 21, 1994

[54] FOAMED GELS TO REDUCE GAS CONING IN MATRIX ENVIRONMENTS

[75] Inventor: Robert D. Sydansk, Littleton, Colo.

[73] Assignee: Marathon Oil Company, Findlay, Ohio

[21] Appl. No.: 37,198

[22] Filed: Mar. 26, 1993

[51] Int. Cl.$^5$ ............................................ E21B 33/138
[52] U.S. Cl. ..................................... 166/295; 166/300; 166/309
[58] Field of Search ................. 166/294, 295, 300, 309

[56] References Cited

U.S. PATENT DOCUMENTS

| | | | |
|---|---|---|---|
| 3,342,261 | 9/1967 | Bond | 166/309 X |
| 3,368,624 | 2/1968 | Heuer, Jr. et al. | 166/309 X |
| 4,232,741 | 11/1980 | Richardson et al. | 166/305.1 X |
| 4,683,949 | 8/1987 | Sydansk et al. | 166/270 |
| 4,903,771 | 2/1990 | Hanssen et al. | 166/309 X |
| 5,105,884 | 4/1992 | Sydansk | 166/270 |

FOREIGN PATENT DOCUMENTS 380150 8/1990 European Pat. Off. .

OTHER PUBLICATIONS

Hanssen, J. E., et al., "Foams for Effective Gas Blockage in the Presence of Crude Oil", SPE/DOE Paper No. 20193, Apr. 22, 1990.

Persoff, P., et al., "Aqueous Foams for Control of Gas Migration and Water Coning in Aquifer Gas Storage", Energy Sources, 1990.

*Primary Examiner*—George A. Suchfield

[57] ABSTRACT

A process is provided for reducing the inhibiting effect of gas coning on liquid hydrocarbon production at a production wellbore penetrating a subterranean reservoir having a gas cap overlying a liquid hydrocarbon producing zone in fluid communication with the gas cap across vertical flowpaths of gas-permeable matrix. A foamed gel containing a crosslinkable polymer, a crosslinking agent, an aqueous solvent, a surfactant, and a gas is injected through the production wellbore into gas-permeable matrix between the gas cap and wellbore, thereby effectively blocking or reducing the downward flow of gas from the gas cap to the production wellbore and enabling the more desirable liquid hydrocarbons to enter the wellbore for production to the surface.

19 Claims, No Drawings

FOAMED GELS TO REDUCE GAS CONING IN MATRIX ENVIRONMENTS

BACKGROUND OF THE INVENTION

1. TECHNICAL FIELD

The present invention relates to a process for recovering liquid hydrocarbons from a production wellbore in fluid communication with a reservoir having a gas cap overlying a liquid hydrocarbon producing zone, and more particularly to such a process wherein a foamed gel is injected into the reservoir to reduce gas coning into the production wellbore.

2. DESCRIPTION OF RELATED ART

A specific problem frequently encountered during the recovery of liquid hydrocarbons from a producing zone of a subterranean reservoir having an overlying gas cap is a phenomenon termed "gas coning". This phenomenon occurs when there is fluid communication between the producing zone and the gas cap across vertical flowpaths. Under sufficient drawdown pressure, the high mobility gas cap gas is drawn down from the gas cap through the vertical flowpaths into the producing zone where it commingles with the lower mobility liquid hydrocarbons residing therein.

Once in the producing zone, the gas cap gas tends to inhibit the flow of liquid hydrocarbons into the wellbore by preferentially flowing through the producing zone and entering the wellbore to the exclusion of the liquid hydrocarbons. Accordingly, gas coning is characterized by a significant increase in the gas/oil ratio of the produced fluids and an attendant significant decrease in the liquid hydrocarbon recovery rate from the production wellbore.

Gas coning treatments generally rely on placement of a gas blocking agent between the gas cap gas and the liquid hydrocarbon production wellbore to substantially block the vertical flowpaths for gas flow into the production wellbore. Such flowpaths are often either vertical fractures or gas-permeable reservoir matrix. U.S. Pat. No. 5,105,884 to Sydansk discloses a gas coning treatment employing a foamed gel as a gas blocking agent in vertical fractures extending between the gas cap and the liquid hydrocarbon producing zone. The foamed gel is made up of a crosslinked polymer gel, surfactant, and foaming gas. As a result of its high degree of structure, strength, and stability, the foamed gel effectively eliminates the gas permeability of the fractures. Foamed gels, however, are generally believed by the prior art to have no practical utility as gas blocking agents in vertical flowpaths of reservoir matrix. The placement of foamed gels in reservoir matrix is considered too difficult because of the relatively low permeability of the matrix and the relatively high degree of structure exhibited by foamed gels upon formulation.

As an alternative to foamed gels, the prior art teaches the use of conventional oilfield foams, which are gel-free foams consisting of only a surfactant solution and a foaming gas, for treating gas coning in matrix environments because such foams have a relatively low degree of structure enabling comparative ease of placement in the reservoir matrix. Unfortunately, the performance of conventional foams in the treatment of gas coning has been found inadequate. Whereas, conventional oilfield foams generally perform satisfactorily as dynamic mobility control fluids in hydrocarbon displacement floods, different performance demands are required of foams in the role of static gas blocking agents. When applied to gas blocking applications, conventional oilfield foams often do not have sufficient structural strength or stability to achieve long-term performance demands when continuously subjected to the gas flow pressure gradient existing during gas coning. Furthermore, conventional oilfield foams often do not have sufficient stability to maintain their structural integrity when subjected to downhole formation conditions typically encountered, particularly in the presence of liquid hydrocarbons.

As is apparent from the above, an effective gas coning treatment process is needed for blocking matrix flowpaths between a gas cap overlying a liquid hydrocarbon producing zone and a production wellbore in fluid communication therewith. Accordingly, it is an object of the present invention to provide a gas blocking agent that can be readily placed in matrix flowpaths, yet has sufficient structure, strength, and stability to satisfy long-term performance demands of the gas coning treatment process.

SUMMARY OF THE INVENTION

The present invention is a process utilizing a foamed gel to reduce the decline rate or to sustain or increase the recovery rate of liquid hydrocarbons from a reservoir via a production wellbore in fluid communication therewith. The process is specific to a reservoir having a gas cap overlying a liquid hydrocarbon producing zone in fluid communication with the gas cap across vertical flowpaths of gas-permeable matrix. The foamed gel is utilized as a gas blocking agent to mitigate the inhibiting effect of gas coning on liquid hydrocarbon production into the production wellbore.

The foamed gel comprises a crosslinkable polymer, a crosslinking agent, an aqueous solvent, a surfactant, and a foaming gas. The foamed gel is placed in the vertical flowpaths of reservoir matrix by injection through the production wellbore. Once in place, the foamed gel effectively blocks or reduces the downward flow of gas cap gas from the gas cap into the producing zone and promotes the more desirable production of liquid hydrocarbons via the wellbore to the surface.

DESCRIPTION OF PREFERRED EMBODIMENTS

A number of specific terms are used throughout the specification to describe the process of the present invention and are defined as follows. A "reservoir" is a subterranean geological structure consisting essentially of "matrix,⇌ and in some instances, "anomalies." The term "reservoir" is synonymous with the term "subterranean hydrocarbon-bearing formation." An "anomaly" is a volume within a reservoir having a very high permeability relative to the matrix. The term "anomaly" is inclusive of such highly permeable volumes as fractures, fracture networks, joints, cracks, fissures, vugs, voids, solution channels, caverns, washouts, cavities, and the like. The "matrix" is generally characterized as substantially continuous, sedimentary geological material having a very low permeability relative to an anomaly. In addition, the matrix is often characterized as competent.

The term "wellbore" is defined as a bore hole extending from the earth surface to the reservoir. Thus, a wellbore is a conduit providing fluid communication between the surface and the reservoir penetrated thereby. A production wellbore enables the removal of fluids from the reservoir to the surface and an injection wellbore enables the placement of fluid into the reservoir from the surface. It is noted that a given wellbore can function interchangeably as a production wellbore or an injection wellbore depending on whether a fluid is being removed from or placed in the wellbore. The term "well" is synonymous with the term "wellbore."

A "gel" or "gel medium" is a continuous three-dimensional crosslinked polymeric network integrating a liquid into the interstices of the network. A "foamed gel" is a specific composition having a stabilized gas dispersion within a gel medium, wherein the gas phase constitutes at least half of the total volume of the foamed gel. The foamed gel structure is made up of gas bubbles separated from one another by stabilized films of the gel medium. In porous media, such as reservoir matrix, the foamed gel may exist as discrete gas bubbles within the pore bodies of the matrix. The bubbles are separated from one another by lamellae of interfacially stabilized films of the gel medium. Other terms used herein have definitions in accordance with the conventional usage of a skilled artisan, unless otherwise defined hereafter.

The foamed gel utilized in the present invention comprises a crosslinkable polymer, a crosslinking agent, a liquid solvent, a surfactant, and a gas. Crosslinkable polymers are well known in the art, and accordingly any such polymer is applicable to the present invention. Carboxylate-containing polymers, however, are preferred crosslinkable polymers with acrylamide-containing polymers being even more preferred. Of the acrylamide-containing polymers, the most preferred are polyacrylamide (PA), partially hydrolyzed polyacrylamide (PHPA), copolymers of acrylamide and acrylate, and carboxylate-containing terpolymers and tetrapolymers of acrylate. PA, as defined herein, has from about 0% to about 3% of its amide groups hydrolyzed. PHPA has greater than about 3% of its amide groups hydrolyzed.

The crosslinking agent of the present invention effectuates crosslinking between appropriate sites of the same or other polymer molecules. Crosslinking of the polymer creates the gel medium which gives the foamed gel a network structure. Crosslinking agents having utility herein are often somewhat specific to the particular crosslinkable polymer being used and, as such, include organic and inorganic crosslinking agents well known in the art. Preferred crosslinking agents specific to the acrylamide-containing polymer are molecules or complexes containing a reactive transition metal cation. More preferred among such crosslinking agents are those including a trivalent chromium cation complexed or bonded to species comprising anions, oxygen and water. Exemplary trivalent chromium crosslinking agents are chromic trichloride and chromic triacetate ($CrAc_3$), as taught in U.S. Pat. No. 4,683,949 which is incorporated herein by reference. Other transition metal cation-containing crosslinking agents applicable to acrylamide-containing polymers, although less preferred, are chromium IV within a redox system, aluminum III within aluminum citrate or aluminum trichlodde, iron II, iron III, and zirconium IV.

Among the above-recited crosslinking agents, those having particular utility in the present invention are crosslinking agents termed "delayed crosslinking agents" that only initiate polymer crosslinking after the crosslinking agent undergoes a preliminary chemical exchange step such as ligand exchange or substitution. In most cases the chemical exchange step is the rate controlling step of the crosslinking reaction and, as such, results in the delaying effect. Both organic and inorganic delayed crosslinking agents having utility herein are well known in the art. A preferred delayed crosslinking agent in the present process is chromic triacetate, wherein the chemical exchange step is believed to be the ligand exchange of acetate with carboxylate groups of the polymer.

The liquid solvent may be any liquid in which the polymer and crosslinking agent can be dissolved, mixed, suspended or otherwise dispersed to facilitate gel formation. The solvent is preferably an aqueous liquid such as fresh water or a brine.

The surfactant may be substantially any conventional anionic, cationic or nonionic surfactant which is distributed throughout the gel medium to stabilize the interfaces between the solvent and gas. Anionic, cationic and nonionic surfactants are well known in general and are commercially available. Unlike conventional oil recovery foams, the present foamed gel has been found to be relatively insensitive to the chemistry of the employed surfactants. Specific surfactants having utility in the present invention include ethoxylated sulfates, ethoxylated alcohols, petroleum sulfonates, and alpha olefin sulfonates.

The foaming gas may be substantially any gas which is substantially nonreactive with the above-recited polymer, crosslinking agent, and surfactant components and which is capable of being dispersed throughout the liquid medium. Examples of foaming gasses having utility herein are nitrogen, methane, carbon dioxide, nitrous oxide, air, natural gas, steam, produced gas and flue gas. Nitrogen or produced gas are preferably used in the production of the present foamed gels.

The foamed gel of the present process is prepared by mixing the components in substantially any order and manner. However, the foamed gel is preferably prepared by first making an aqueous gel composition, which is an aqueous solution of the polymer, crosslinking agent and surfactant in the liquid solvent. The polymer and crosslinking agent are combined in relative proportions, for example, as taught by U.S. Pat. No. 4,683,949. The surfactant concentration in the gel composition is about 10 ppm to about 50,000 ppm, preferably about 100 ppm to about 10,000 ppm, and most preferably about 200 ppm to about 8,000 ppm. Typically, the gel composition is prepared by mixing discrete aqueous solutions of the polymer, crosslinking agent, and surfactant.

Preparation of the foamed gel proceeds by adding the foaming gas to the aqueous gel composition. The foaming gas can be added to the gel composition by conventional means such as sparging, high speed mixing, or simultaneously flowing the foaming gas and gel composition through an orifice or solid packing, such as a sandpack, a gravel pack, or the reservoir matrix itself. The location and timing of the gas addition step can be any one of several alternatives, including at the surface prior to injection of the foamed gel into the wellbore, or within the wellbore or reservoir following sequential injection or coinjection of the foaming gas and gel composition into the wellbore. In yet another alternative, the foaming gas can be added to the aqueous gel composition in-situ by placing the gel composition alone in the reservoir via the wellbore and subsequently back producing the gas cap gas therethrough, thus mixing the gas cap gas, acting as the foaming gas, with the gel composition.

Formation of the foamed gel continues with crosslinking of the polymer and crosslinking agent within the gel composition. Crosslinking, or gelation as it is alternatively termed, is initiated as soon as the polymer and crosslinking agent contact. If a delayed crosslinking agent is used, however, sufficient crosslinking for effective gelation is not attained until after the delayed gelation time is exceeded. During the crosslinking step, the foamed gel is characterized as being immature. Once the crosslinking step has gone to completion, i.e., when either substantially all of the crosslinking agent or substantially all of the polymer crosslinking sites is consumed, the foamed gel is characterized as being mature.

The integral components of the resulting foamed gel are the gel medium and the gas dispersed therein. The gel medium substantially enhances the structure and stability of the foamed gel. The crosslinked polymer makes up the structural network of the gel medium and the liquid solvent makes up the interstitial liquid of the medium.

The physical properties of the foamed gel are a function of the specific foamed gel components and their relative proportions. Foamed gels can be made by selecting values of the above-recited variables to create either flowing or non-flowing foamed gels across a range of viscosities and densities as desired. Both flowing and non-flowing foamed gels have utility in the present process. A flowing foamed gel is a foamed gel which flows in a bottle at ambient atmospheric conditions under the force of gravity, while a nonflowing foamed gel is one which will not flow under such conditions. Within the range of nonflowing foamed gels are rigid foamed gels to elastically deformable foamed gels. Within the range of flowing foamed gels are highly viscous foamed gels to foamed gels having about the same viscosity as water.

It has been found that foamed gels having substantially the same performance characteristics as corresponding unfoamed gels, i.e., gels absent a foaming gas, can be formed despite the relatively high gas volume of the foamed gels. Furthermore, foamed gel performance does not significantly diminish as the volumetric gas content of the foamed gel increases up to certain limits. The gas content of the foamed gel, termed foam quality, is expressed as the volume percent of gas in the foamed gel. Foamed gels generally have utility in the present process which have a quality between about 50% and about 99%, preferably between about 60% and about 98%, and most preferably between about 70% and about 96%. Thus, it is apparent that the present foamed gels can be tailored to meet the specific performance requirements of the given reservoir. The foamed gels are tailored simply by selecting the specific foam components and adjusting their relative proportions within the ranges recited above.

Once a foamed gel is prepared according to the process described herein, it can be substituted for and used in the same manner as a conventional foam for gas coning treatments of matrix flowpaths. For the reasons set forth herein, performance of the present foamed gel is superior in most cases to that of conventional gas coning treatment materials for which the foamed gel is substituted.

Although it is noted above that both flowing and non-flowing foamed gels have utility in the process of the present invention, a non-flowing foamed gel is preferred. The non-flowing foamed gel remains immature during injection and placement in the reservoir matrix, preferably by means of a delayed crosslinking agent, so that the foamed gel can be readily displaced through the wellbore into the matrix. Once the non-flowing foamed gel is in place in the desired reservoir matrix treatment region, it is cured to full maturity. In most cases, the non-flowing foamed gel advantageously has a yield pressure greater than the gas flow pressure gradient of the gas cap gas, as well as any other injection or production pressures typically encountered during oil production, thereby enabling the gel medium to resist rupturing and to remain in place throughout the production life of the reservoir.

Although less preferred, flowing foamed gels can alternatively be employed in the present process. Flowing foamed gels can be either mature or immature during injection and placement in the reservoir matrix since either is capable of flowing through the wellbore into the matrix. Once in place, the flowing foamed gel commonly has a critical pressure gradient for flow greater than the gas flow pressure gradient of the gas cap gas, as well as any other injection or production pressures typically encountered during oil production, thereby enabling the flowing foamed gel to resist flow within the matrix and to remain in place throughout the production life of the reservoir.

Placement of the foamed gel in the vertical flowpaths of reservoir matrix encompasses injection of the foamed gel components into the liquid hydrocarbon production wellbore penetrating the reservoir, in the manner related above. Although the present wellbore is termed a "liquid hydrocarbon production wellbore" throughout the description, it is understood that pursuant to the present process the wellbore may be temporarily employed as an injection wellbore for placement of the foamed gel in the vertical flowpaths, but the wellbore is functionally restored to a liquid hydrocarbon production wellbore upon the completion of foamed gel placement. Accordingly, liquid hydrocarbon production from the wellbore is temporarily interrupted during the foamed gel injection step of the present process.

The reservoir penetrated by the wellbore is characterized as having a liquid hydrocarbon producing zone in direct fluid communication with the production wellbore by conventional means such as perforations placed in the wellbore casing at the vertical position of the producing zone. The reservoir additionally has a gas cap overlying the producing zone and vertical flowpaths that permit gas cap gas to flow into and across the producing zone and into the production wellbore. The vertical flowpaths comprise gas-permeable matrix that is present in the producing zone and in the gas cap adjacent to the producing zone. As is apparent, it is desirable in accordance with the present invention to place the foamed gel within the vertical flowpaths which undesirably facilitate gas coning.

A degree of selective placement of the foamed gel in overlying gas-permeable matrix making up the vertical flowpaths is provided by the specific density characteristics of the foamed gel employed herein. In general, the foamed gel is formulated to have a relatively lower density than the liquids residing in the producing zone, yet preferably has a higher density than the gas residing in the gas cap. As such, when the foamed gel enters the producing zone across the casing perforations of the liquid hydrocarbon production wellbore, the foamed gel tends to preferentially flow upward through the formation into the vertical flowpaths, driven by the density differential between the foamed gel and resident liquids. It is also desirable to distribute the foamed gel radially outward within the overlying matrix, thereby placing a horizontal foamed gel lens between the main body of the gas cap and the liquid hydrocarbon producing zone to substantially prevent the gas cap gas from circumventing the foamed gel blockage to reach the wellbore and inhibit liquid hydrocarbon production.

The character of the region of the formation in which it is desired to place the foamed gel can influence the selection of a specific foamed gel composition. In general, placement of a foamed gel in less permeable matrix preferentially dictates selection of a foamed gel having relatively limited structure. The degree of structure of the foamed gel formulated in the manner of the present invention is inter alia a function of the polymer properties, the polymer concentration, and the degree and character of crosslinking.

In general, the degree of structure of a foamed gel containing an acrylamide polymer is increased by increasing the polymer concentration of the liquid phase. However, an oftentimes more cost-effective and preferred means for achieving the same effect is to employ a higher molecular weight polymer or, alternatively, a polymer having a higher degree of hydrolysis (typically up to about 5% hydrolysis) at a relatively fixed concentration. Conversely, a reduction in the degree of structure is achieved by using a lower molecular weight polymer or, alternatively, one having a lower degree of hydrolysis. Thus, the skilled practitioner can modify the degree of structure of the present foamed gel in the above-described manner to correspond with the permeability of the region of the formation in which the foamed gel is to be placed.

Relative to conventional polymer-free oilfield foams, the foamed gel is significantly more stable and resistant to displacement resulting from rupture or flow. The foamed gel is stable over a wide range of temperatures, pressures, and reservoir water salinities and hardness. The foamed gel is also highly stable in the presence of liquid hydrocarbons, resisting collapse and fluid drainage. Thus, placement of the foamed gel in matrix flowpaths provides long-term gas blockage to the production wellbore, thereby substantially reducing gas coning when liquid hydrocarbon production is resumed after foamed gel injection is terminated and the foamed gel is fully in place within the reservoir. Nevertheless, the reservoir can be restored to its original condition, if desired, by injection of a gel breaker into the reservoir to degrade the foamed gel in situ.

The present process has been described above wherein the foamed gel has been used as a primary initial gas coning treatment. However, the foamed gel may also be used as a remedial gas coning treatment wherein the reservoir has initially undergone a conventional gas coning treatment, such as treatment with a flowing gel-free foam, including a conventional oilfield foam or a polymer enhanced foam containing an uncrosslinked polymer. If the gas flow pressure gradient of the gas cap gas during gas coning exceeds the critical pressure gradient for flow of the gel-free foam, the foam will begin to flow and the treatment will fail. In such cases, the reservoir may be subsequently treated with the present foamed gel which is substantially more resistant to rupture or flow due to its greater yield pressure or critical pressure gradient for flow respectively, rendering the foamed gel more permanent than known gel-free foams.

The following examples demonstrate the practice of the present invention, but are not to be construed as limiting the scope thereof.

EXAMPLE 1

A flooding experiment is performed at ambient temperature in a 30.5 cm long, 20-30 mesh, 124 darcy Ottawa Test Sand sandpack at residual saturation with crude oil and a synthetic oilfield brine having a total dissolved solids (TDS) concentration of 10,300 ppm and having significant hardness and sulfate concentrations. A foamed gel is produced by coinjecting nitrogen and a gel composition at a constant low differential pressure into the sandpack and displacing them across the length of the sandpack. The gel composition is a liquid solution containing the above-described synthetic brine, 9,000 ppm PA having a molecular weight of 11,000,000 and having 2% of its amide groups hydrolyzed, 170 ppm chromium III ion in a chromic acetate complex, and 3,000 ppm C14–16 alpha olefin sulfonate surfactant. The produced foam quality at the sandpack outlet is 88%.

The foamed gel is allowed to mature within the sandpack. The sandpack is then flooded with the synthetic brine at four four-hour injection intervals of increased pressure. The differential pressure at each interval is 35, 69, 124, and 172 kPa, respectively. After the first three injection intervals, no produced fluid is detected. The permeability reduction ($k_f/k_i$) of the sandpack after the final injection interval is measured to be $5 \times 10^{-5}$, wherein $k_f$ is 2 red.

Upon completion of the brine injection sequence, the sandpack is flooded with nitrogen gas by applying a 35 kPa and a 69 kPa differential pressure across the sandpack for 20 and 22 hours, respectively. No throughput of materials, including gas, is observed during this stage of gas flooding.

The results of Example 1 show that the above-described foamed gel can be an effective gas coning treatment composition in the presence of saline brines and crude oil in matrix environments.

EXAMPLE 2

An ambient temperature flooding experiment is performed in two sandpacks in series. The first sandpack is 15.2 cm long and serves as a foam generator. The second sandpack is 122 cm long and models a reservoir being treated with a foamed gel to reduce gas coning. Both sandpacks are 20–30 mesh Ottawa Test Sand sandpack at residual saturation with crude oil and a synthetic oilfield brine having a total dissolved solids (TDS) concentration of 10,300 ppm and having significant hardness and sulfate concentrations. The sandpacks have an effective permeability to brine at residual oil saturation of about 100 darcies.

A foamed gel is generated by coinjecting nitrogen and a gel composition having a combined pore volume of 4.5 (the pore volume is based on both sandpacks) at a constant differential pressure into the first sandpack and displacing it across the length of the two sandpacks. The gel composition is a liquid solution containing the above-described synthetic brine, 9,000 ppm PA having a molecular weight of 11,000,000 and having 2% of its amide groups hydrolyzed, chromium III ion in the form of a chromic acetate ($CrAc_3$) complex, and 3,000 ppm $C_{14-16}$ alpha olefin sulfonate surfactant. The PA:CrAc$_3$ ratio in the gel composition is 12:1 by weight.

The produced foam quality at the second sandpack outlet is 69%. The produced foam is allowed to mature in the second sandpack and the sandpack is thereafter flooded with nitrogen gas by applying a 345 kPa differential pressure across the sandpack for 336 hours. No throughput of materials is observed during this stage of gas flooding. The differential pressure of the gas flood is then increased to 517 kPa and flooding is continued for 216 hours. Again, no throughput of materials is observed during this stage of gas flooding.

The results of Example 2 reaffirm those of Example 1, showing that the above-described foamed gel can be an effective gas coning treatment composition in the presence of saline brines and crude oil in matrix environments.

EXAMPLE 3

A flooding experiment is performed at 49° C. in a fired Berea sandstone core plug 7.6 cm in length and having a diameter of 2.5 cm. The core plug has a permeability of 490 md and a porosity of 22%. The plug is initially at residual oil saturation with a synthetic reservoir brine and a crude oil. The synthetic reservoir brine has a total dissolved solids (TDS) concentration of 5,800 ppm and is high in hardness (560 ppm $Ca^{2+}$ and 160 ppm $Mg^{2+}$) and high in sulfate (2,000 ppm $SO_4^{2-}$). The crude oil has a viscosity of 53 cp at 49° C.

About 4 pore volumes of an immature foamed gel comprising nitrogen foaming gas and an aqueous gel composition are produced at atmospheric pressure. The quality of the immature foam is 73%. The gel composition contains a solution of 5,500 ppm PHPA having a molecular weight between about 10,000,000 and about 15,000,000 and having 7% of its amide groups hydrolyzed, 524 ppm chromic acetate complex (119 ppm chromium III ion) with a 10.5:1 weight ratio of polymer to crosslinking agent, and 2,500 ppm $C_{14-16}$ alpha olefin sulfonate surfactant in the synthetic reservoir brine. The immature foamed gel is injected into the core plug and the plug is shut in for 48 hours enabling the foamed gel to reach maturity.

Injection into the core plug is then attempted for 168 hours with nitrogen gas at a differential pressure of 172 kPa. No gas or liquid is produced during this period from the treated core plug. The results of Example 3 show that the above-described foamed gel can be an effective blocking agent in a competent matrix core plug having a permeability representative of reservoir matrix.

While the foregoing preferred embodiments of the invention have been described and shown, it is understood that alternatives and modifications, such as those suggested and others, may be made thereto and fall within the scope of the present invention.

I claim:

1. A process for reducing gas coning in a subterranean reservoir at or near a liquid hydrocarbon production wellbore, wherein said wellbore extends from the surface to penetrate a liquid hydrocarbon producing zone of said reservoir in fluid communication with an overlying gas cap across a flowpath of gas-permeable matrix, the process comprising:
    placing a foamed gel in said flowpath, wherein said foamed gel comprises a crosslinkable polymer, a crosslinking agent, a surfactant, an aqueous solvent, and a foaming gas and wherein said foamed gel substantially reduces the gas permeability of said flowpath to inhibit flow of a gas cap gas from said gas cap into said wellbore.

2. The process for reducing gas coning of claim 1 further comprising:
    formulating said foamed gel by premixing said polymer, crosslinking agent, surfactant and solvent to form a gel composition and contacting said gel composition with said foaming gas at the surface; and
    injecting said foamed gel into said reservoir via said production wellbore.

3. The process for reducing gas coning of claim 1 further comprising:
    premixing said polymer, crosslinking agent, surfactant and solvent to form a gel composition; and
    coinjecting said gel composition and said foaming gas into said reservoir via said wellbore to form said foamed gel.

4. The process for reducing gas coning of claim 1 further comprising:
    premixing said polymer, crosslinking agent, surfactant and solvent to form a gel composition;
    sequentially injecting said gel composition and said foaming gas into said reservoir via said wellbore; and
    contacting said gel composition and said foaming gas in said reservoir to form said foamed gel.

5. The process for reducing gas coning of claim 1 further comprising:
    premixing said polymer, crosslinking agent, surfactant and solvent to form a gel composition;
    injecting said gel composition into said reservoir via said wellbore; and
    contacting said gel composition with said foaming gas in said reservoir to form said foamed gel, wherein said foaming gas is said gas cap gas flowing through said reservoir from said gas cap.

6. The process for reducing gas coning of claim 1 wherein said foamed gel is less dense than the liquid hydrocarbon in said producing zone.

7. The process for reducing gas coning of claim 1 wherein said crosslinkable polymer comprises an acrylamide polymer.

8. The process for reducing gas coning of claim 7 wherein said acrylamide polymer is selected from a group consisting of polyacrylamide, partially hydrolyzed polyacrylamide, copolymers of acrylamide and acrylate, and carboxylate-containing terpolymers and tetrapolymers of acrylamide.

9. The process for reducing gas coning of claim 1 wherein said crosslinking agent comprises trivalent chromium.

10. The process for reducing gas coning of claim 1 wherein said crosslinking agent comprises chromic triacetate.

11. The process for reducing gas coning of claim 1 wherein said surfactant is selected from a group consisting of ethoxylated sulfates, ethoxylated alcohols, petroleum sulfonates, and alpha olefin sulfonates.

12. The process for reducing gas coning of claim 1 wherein said aqueous solvent is a brine.

13. A remedial process for reducing gas coning in a subterranean reservoir at or near a liquid hydrocarbon production wellbore, wherein said wellbore extends from the surface to penetrate a liquid hydrocarbon producing zone of said reservoir in fluid communication with an overlying gas cap across a flowpath of gas-permeable matrix, and further wherein said flowpath has been treated with a conventional gas blocking agent which does not substantially block said flowpath, the process comprising:

placing a foamed gel in said flowpath, wherein said foamed gel comprises a crosslinkable polymer, a crosslinking agent, a surfactant, an aqueous solvent, and a foaming gas and wherein said foamed gel substantially reduces the gas permeability of said flowpath to inhibit flow of a gas cap gas from said gas cap into said wellbore.

14. The process for reducing gas coning of claim 13 wherein said foamed gel is less dense than the liquid hydrocarbon in said producing zone.

15. The process for reducing gas coning of claim 13 wherein said crosslinkable polymer comprises an acrylamide polymer.

16. The process for reducing gas coning of claim 15 wherein said acrylamide polymer is selected from a group consisting of polyacrylamide, partially hydrolyzed polyacrylamide, copolymers of acrylamide and acrylate, and carboxylate-containing terpolymers and tetrapolymers of acrylamide.

17. The process for reducing gas coning of claim 13 wherein said crosslinking agent comprises trivalent chromium.

18. The process for reducing gas coning of claim 13 wherein said surfactant is selected from a group consisting of ethoxylated sulfates, ethoxylated alcohols, petroleum sulfonates, and alpha olefin sulfonates.

19. The process for reducing gas coning of claim 13 wherein said aqueous solvent is a brine.

* * * * *

UNITED STATES PATENT AND TRADEMARK OFFICE
CERTIFICATE OF CORRECTION

PATENT NO. : 5,322,125

DATED : June 21, 1994

INVENTOR(S) : Robert D. Sydansk

It is certified that error appears in the above-identified patent and that said Letters Patent is hereby corrected as shown below:

Col. 2, line 51: Delete "⇌". and insert -- "--.
Col. 8, line 20: Delete C14-16" and insert --$C_{14-16}$--.
Col. 8, line 30: Delete "red" and insert --md--.
Col. 8, line 37: Delete "1show" and insert --1 show--.

Signed and Sealed this

Third Day of January, 1995

Attest:

BRUCE LEHMAN

Attesting Officer    Commissioner of Patents and Trademarks